(12) United States Patent
Regensburger et al.

(10) Patent No.: US 11,036,040 B2
(45) Date of Patent: Jun. 15, 2021

(54) DIGITAL MICROSCOPE AND DIGITAL MICROSCOPY METHOD

(71) Applicant: Carl Zeiss Meditec AG, Jena (DE)

(72) Inventors: Alois Regensburger, Poxdorf (DE); Christoph Hauger, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 16/403,242

(22) Filed: May 3, 2019

(65) Prior Publication Data

US 2019/0339506 A1    Nov. 7, 2019

(30) Foreign Application Priority Data

May 3, 2018    (DE) ............... 10 2018 110 644.0

(51) Int. Cl.
*G02B 21/36*    (2006.01)
*H04N 5/232*    (2006.01)
(Continued)

(52) U.S. Cl.
CPC ....... *G02B 21/365* (2013.01); *G02B 21/0012* (2013.01); *G02B 21/368* (2013.01); *H04N 5/23296* (2013.01); *H04N 7/183* (2013.01)

(58) Field of Classification Search
CPC ............. G02B 21/365; G02B 21/0012; G02B 21/368; G02B 2027/0147; G02B 2027/0185; G02B 27/0093; H04N 5/23296

See application file for complete search history.

(56) References Cited

U.S. PATENT DOCUMENTS 6,151,070 A * 11/2000 Sato .................. H04N 5/23212
                                                            348/240.99
6,323,839 B1 * 11/2001 Fukuda ................... G06F 3/033
                                                            345/157
(Continued)

FOREIGN PATENT DOCUMENTS

DE        10203215 A1    8/2003
DE        10204430 A1    8/2003
(Continued)

OTHER PUBLICATIONS

B. Mendiburu "3D Movie Making," Stereoscopic Digital Cinema from Script to Screen, 1st Edition, Description, last accessed at https://www.routledge.com/3D-Movie-Making-Stereoscopic-Digital-Cinema-from-Script-to-Screen-1st/Mendiburu/p/book/9780240811376 on May 29, 2019.

(Continued)

*Primary Examiner* — Brian P Yenke
(74) *Attorney, Agent, or Firm* — Falk Ewers; Ewers IP Law PLLC

(57) ABSTRACT

A digital microscope is provided. The digital microscope includes an adjustable imaging system configured to display an object on an electronic display device, a control device which adjusts the imaging system, and a distance capturing device configured to determine a distance between an observer and the display device. The control device determines a perceivable structure size, perceivable on the display device, depending on the distance, and adjusts the imaging system to permit a resolved structure size, resolved by the display device, to be identical to the perceivable structure size within a given tolerance range.

18 Claims, 1 Drawing Sheet

(51) Int. Cl.
*G02B 21/00* (2006.01)
*H04N 7/18* (2006.01)

(56) References Cited

U.S. PATENT DOCUMENTS

| | | | |
|---|---|---|---|
| 6,592,223 B1 | 7/2003 | Stern et al. | |
| 7,768,702 B2 | 8/2010 | Hirose et al. | |
| 8,711,204 B2 | 4/2014 | Smolic et al. | |
| 8,768,044 B2 | 7/2014 | Hong et al. | |
| 9,295,451 B2 | 3/2016 | Kim | |
| 9,360,934 B2 | 6/2016 | Ruiz Morales et al. | |
| 9,652,847 B2* | 5/2017 | Winterot | G06T 7/80 |
| 9,696,549 B2* | 7/2017 | Bean | G06F 3/04817 |
| 9,704,216 B1* | 7/2017 | Laskar | G06F 3/013 |
| 9,952,665 B2* | 4/2018 | Di Censo | G02B 27/01 |
| 10,110,883 B2* | 10/2018 | Mullins | G02B 27/0172 |
| 10,298,840 B2* | 5/2019 | Guenter | H04N 5/23232 |
| 10,345,903 B2* | 7/2019 | Robbins | G02B 27/0172 |
| 2003/0151810 A1 | 8/2003 | Haisch et al. | |
| 2004/0017607 A1 | 1/2004 | Hauger et al. | |
| 2004/0036962 A1 | 2/2004 | Brunner et al. | |
| 2005/0063047 A1 | 3/2005 | Obrebski et al. | |
| 2006/0092505 A1 | 5/2006 | Abnet et al. | |
| 2007/0047073 A1 | 3/2007 | Zimmer et al. | |
| 2007/0121204 A1 | 5/2007 | Wiederhoft et al. | |
| 2007/0230666 A1 | 10/2007 | Spahn | |
| 2008/0266657 A1 | 10/2008 | Strahle et al. | |
| 2010/0250765 A1* | 9/2010 | Riggert | H04N 21/6379 709/231 |
| 2011/0279651 A1 | 11/2011 | Hong et al. | |
| 2012/0002084 A1 | 1/2012 | Weissman et al. | |
| 2012/0002274 A1 | 1/2012 | Knoblich et al. | |
| 2012/0069179 A1* | 3/2012 | Gish | H04N 7/183 348/143 |
| 2012/0176371 A1 | 7/2012 | Morifuji et al. | |
| 2012/0176482 A1* | 7/2012 | Border | H04N 13/344 348/51 |
| 2013/0010069 A1* | 1/2013 | Raju | H04N 13/128 348/46 |
| 2013/0016187 A1 | 1/2013 | Zhang et al. | |
| 2013/0271575 A1* | 10/2013 | Ullmann | H04N 13/279 348/46 |
| 2014/0055578 A1 | 2/2014 | Wu et al. | |
| 2015/0173846 A1 | 6/2015 | Schneider et al. | |
| 2016/0182954 A1* | 6/2016 | Nguyen | H04N 21/4722 725/10 |
| 2016/0202487 A1* | 7/2016 | Iguchi | G02B 27/017 345/8 |
| 2017/0322422 A1* | 11/2017 | Stone | G02B 27/0172 |
| 2018/0136450 A1* | 5/2018 | Regensburger | H04N 5/23296 |
| 2018/0275410 A1* | 9/2018 | Yeoh | G02B 27/0093 |
| 2018/0308269 A1* | 10/2018 | Baran | G06T 11/60 |
| 2018/0344413 A1* | 12/2018 | Rappel | A61B 34/00 |
| 2019/0043413 A1* | 2/2019 | Kim | G09G 3/3674 |
| 2019/0238822 A1* | 8/2019 | Kuchnio | H04N 13/239 |
| 2019/0287495 A1* | 9/2019 | Mathur | G09G 5/391 |
| 2019/0332244 A1* | 10/2019 | Beszteri | G06F 3/013 |

FOREIGN PATENT DOCUMENTS

| | | |
|---|---|---|
| DE | 10306970 A1 | 9/2004 |
| DE | 10335644 B3 | 12/2005 |
| DE | 102006036300 A1 | 3/2007 |
| DE | 202005021436 U1 | 3/2008 |
| DE | 102006009452 B4 | 7/2010 |
| DE | 102009012707 A1 | 9/2010 |
| DE | 102006011233 B4 | 4/2011 |
| DE | 102012108249 A1 | 6/2014 |
| DE | 102015216573 A1 | 9/2016 |
| EP | 1333305 B1 | 4/2007 |
| EP | 2472883 A1 | 7/2012 |

OTHER PUBLICATIONS

Zilly et al., "The Stereoscopic Analyzer—An Image-Based Assistance Tool for Stereo Shooting and 3D Production", Fraunhofer Institute for Telecommunications—Heinrich-Hertz-Institut, Berlin, Germany (2009).

Lang et al., "Nonlinear Disparity Mapping for Stereoscopic 3D", ACM Transactions on Graphics (TOG), Proceedings of ACM SIGGRAPH 2010, vol. 29, Jul. 4, 2010, Article No. 75 (2010).

Leica: Leica M720 OHS—Bright Care and Autolris (2013).

Nikon: „Optical vs. Digital Zoom, Dec. 21, 2016 (2016).

Zeiss: TRENION 3D HD from Zeiss, last accessed at https://www.zeiss.com/meditec/us/products/neurosurgery/visualization-systems/trenion-3d-hd.html on May 4, 2019 (2019).

* cited by examiner

DIGITAL MICROSCOPE AND DIGITAL MICROSCOPY METHOD

CROSS REFERENCE TO RELATED APPLICATIONS

This application claims priority to German patent application DE 10 2018 110 644.0, filed May 3, 2018, the entire content of which is incorporated herein by reference.

TECHNICAL FIELD

The disclosure relates to a digital microscope, including an adjustable imaging system for presenting an object on an electronic display device and a control device which adjusts the imaging system. The disclosure further relates to a digital microscopy method for imaging an object, wherein the object is imaged and presented with an imaging system, and wherein the imaging system is adjusted.

BACKGROUND

Digital microscopes and digital microscopy methods image an object by an imaging system, generate an electronic image, and present the latter on a display device. Since generally no optical view is provided anymore, the imaging system can be adjusted in many ways, which allows diverse optimizations. In digital surgical microscopes, the display is realized by way of a monitor. Due to space reasons and on account of other objects in the operating field, the monitor is sometimes located several meters away from observers. To improve observation of the monitor in a surgical microscope, DE 102006011233 B4 describes darkening the area in which the monitor is arranged and increasing the contrast of the presentation.

SUMMARY

It is an object of the disclosure to provide a microscope and a microscopy method in which the presentation of an image of an object is optimized.

A digital microscope and a digital microscopy method are provided to permit the distance at which the observer is located from the display device to be captured. Based on this distance, the structure size that the observer can perceive on the display device is ascertained. This perceivable structure size depends on the distance if the basis is a standard visual acuity of the observer. If the visual acuity of the observer is known, for example because it was previously measured, the visual acuity can additionally be taken into consideration. The observer would not be able to discern on the display device structure sizes which are smaller than the perceivable structure size. For this reason, the microscope or the microscopy method makes provision for the imaging system to be set such that structure sizes smaller than the perceivable structure size do not appear on the display either. In other words, the imaging system does not offer unnecessary resolution that would result in structure details that are no longer perceivable. This sacrifice in terms of resolution makes possible optimization of other image production parameters. Many possibilities exist in this regard. A particularly common example is the reduction in illumination intensity, which typically manifests in poorer image resolution.

It is also possible to change a plurality of variables of the imaging system in opposite ways. Such an opposing change is frequently useful to retain the optical overall impression that the observer has, for example a total magnification of the object. The total magnification should generally remain constant for the user. One example of opposing changes is therefore the reduction in the illumination intensity with simultaneous pixel binning on the detector side or in the case of the electronic image processing. Pixel binning causes a reduction in resolution and an increase in light sensitivity. Since, in an opposite manner, the illumination intensity is decreased, the object overall is exposed less to illumination radiation, which is highly advantageous for many surgical applications. As a consequence, the structure size that is resolved on the display device increases. However, this is no problem at all in the microscope or in the microscopy method as long as it does not increase to beyond the previously ascertained perceivable structure size. In other words, the microscope and the microscopy method dispense with unnecessary resolution and are therefore able to optimize other image production parameters.

When setting the actual structure size, digital magnifications, such as in what is known as "upscaling" in high-resolution monitors, for example 4 k screens, can also be taken into consideration.

The structure size describes the resolution of the image, that is to say the distance between two points that are separated in the image (resolved structure size) and are recognized as such (perceivable structure size). Consequently, it typically describes a minimum distance between two features in the object, which in the image are separated structures.

With respect to the structure size, ultimately only the structure size that is still recognizable by the observer on the display device is important. In terms of control technology, it is of course possible to relate this structure size to the object or to an intermediate stage, for example an image plane in the imaging system. The term resolved structure size or perceivable structure size is therefore not limited exclusively to the display device, but can also relate to the object or an intermediate stage of the imaging. It is likewise possible to simply convert the structure size on the display device into a structure size of an image plane or a structure size of the object by way of the imaging factor, which means that mixed approaches are possible.

When setting or adjusting the actual structure size, digital magnifications, such as in what is known as "upscaling" in high-resolution monitors, for example 4 k screens, can also be taken into consideration.

The microscope typically includes a zoom optical unit arranged in the imaging beam path, a detection device, and the display device. The zoom optical unit images the object with at least one settable imaging parameter onto the detection device. The detection device generates an electronic image of the object from the imaging of the object with at least one settable capturing parameter. The display device is configured to display the image to an observer.

The microscope includes a control device, in which for example an indication as to the nature of the effect of the at least one imaging parameter and the at least one capturing parameter on a resolvable structure size is stored. The control device ascertains the distance between observer and the display device and adapts the imaging parameters and/or the capturing parameters and/or digitally post-enlarges the image until the actually resolved structure size realizes the perceivable resolution within a given tolerance range. The imaging and/or detection is thereby adjusted such that the observer will see the image per se always with optimum sharpness on the display device. However, at the same time, unnecessary complexity when imaging and/or detecting that would result in details of the image which are no longer perceivable is avoided. As a result, other image properties can be optimized, for example the depth of field, frame rate or working distance, which slightly affect the object resolution but, due to the ascertainment performed, not in a disturbing manner. Ascertaining the perceivable structure size and taking it into consideration overall results in an improved image for the observer.

According to an aspect of the disclosure, the control device includes a storage device, such as a writable memory, in which an indication about the effect of the adjustment of the imaging system, for example of imaging parameters and capturing parameters, on the resolved structure size is stored. The indication may be a table of values, for example. Intermediate values of the table of values can be interpolated. The indication can also be a functional relationship. The control device is thus configured to determine the resolved structure size by the indication, that is to say from the imaging parameters and the capturing parameters.

According to another aspect of the disclosure, the control device calculates a difference between the resolved structure size and the still perceivable structure size and adjusts the imaging system such that the difference becomes smaller and an improvement of properties of the image occurs. The change in the difference is used in particular to check whether a variation of the imaging parameter and/or of the capturing parameter has the result that the perceivable structure size is reached and not exceeded. In this way, it is possible to automate the setting. The image properties can be, as already mentioned, the depth of field, frame rate or working distance. Due to the fact that the change in imaging parameters and/or capturing parameters have less of an effect on the object resolution and a change up to the threshold of the still perceivable structure size is not detectable by the observer, the properties of the image can be improved.

Aspects of the microscope described herein and of the control device thereof similarly apply to the microscopy method, and vice versa.

The control device determines the structure size that is perceivable by the user on the display device for example as follows.

The actually perceivable structure size in the image displayed on the display device is reduced owing to the distance of the observer from the display device or owing to any refractive error of the observer. If the observer moves away from the display device, the structure size that is perceivable by him or her decreases, as a result of which the observer may no longer be able to identify details shown in the image at all. The image would show pieces of information which are unnecessary because the observer cannot identify them. The control device is configured to adapt the structure size which is actually resolved on the display device by changing the capturing parameter and/or imaging parameter in a manner such that it is the same as the perceivable structure size within a given tolerance range. Imaging of the object and production of the image are modified such that no unnecessary information appears. At the same time, imaging or production of the image is optimized in other ways, as mentioned. The sacrifice in resolution is not noticed by the observer.

The tolerance range is typically such that the upper limit thereof coincides with the perceivable structure size; that is to say the resolution is never worse than it is perceivable. By way of example, the lower limit can lie 10%, 20%, or 30% below the perceivable structure size, which provides a buffer zone.

For specific applications, it is useful for a maximum resolved structure size not to be exceeded, even if the perceivable structure size becomes very large. For example, if the observer moves away from the display device, the still perceivable structure size increases. If the image presented on the display device is simultaneously recorded for later viewing, it may be disadvantageous to reduce the resolution in the presented image too much, even if the still perceivable structure size would permit it. For such cases, the tolerance range is configured such that it prescribes an upper limit for the resolved structure size.

In particular, the microscope is configured as a stereo surgical microscope. The microscope is typically a purely digital microscope, that is to say the object can be observed only using the display device and not using an optical eyepiece; combinations are possible.

The object is specifically a sample or a body that is to be observed using the microscope, for example a human being or a body part of a human being or of an animal. Radiation coming from the object is guided into an imaging beam path.

The control device can be for example a microprocessor, a computer having a correspondingly configured computer program, or another electric circuit. The control device generates a digital image from electrical signals. The control device is connected to the imaging system via a data link using electrical lines or by radio. For example, the control device can drive a motor which changes the position of lenses in a zoom optical unit in relation to one another. The distance capturing device can be configured as an element of the control device. It is possible for example for the control device to have a capturing device, into which a distance between the observer and the display device is entered. Alternatively or additionally, it is possible, via the input device or an interface, to communicate to the control device the type of display device that is used by an observer. For specific display devices, the control device can already ascertain from this indication the distance between the observer and the display device. Such a display device can be, for example, a head-mounted display (HMD) or a display device worn on the body of the observer. The same is true for an electronic eyepiece into which the observer looks. In such cases, the distance in the viewing situation is known, which means that the control device realizes the distance capturing device in a manner such that the control device ascertains the type of the display device and determines therefrom the distance between observer and display device.

The display device can be, for example, a monitor or screen on which the image is displayed. In a stereo microscope, the display device is configured to display for the observer a stereo image, such that the observer receives a stereoscopic impression of the image. The display device is typically connected to the control device controlling the display of the image on the display device via a data link using electrical lines or by radio.

The display device can be positionally fixed, and the distance capturing device can be a distance measurement device for determining the distance. The display device can also be configured to be worn by the observer, for example a HMD, smart glasses, or digital binoculars. The display device can be in particular a screen or monitor which is positionally fixed for example in an operating theater. It may be possible to move the display device into a desired position, or the display device moves into specified positions in dependence on the position of the observer. Using the distance capturing device, it is possible to determine the distance of the viewer from the display device continuously or in point-wise fashion. The observer can carry a mark that is evaluated on his or her head or body.

According to an aspect of the disclosure, a visual acuity of the observer can be input by the capturing device. The visual acuity can also be referred to as eyesight. If the eyesight of the observer is lower than a standard value, the perceivable structure size deteriorates. A relationship between distance/visual acuity and perceivable structure size can be stored in the control device in the form of a table of values or function. The visual acuity, for example, can be acquired using the input device or in another way. The visual acuity may be able to be determined with the aid of the microscope, in particular the capturing device. An advantage of taking the visual acuity into consideration is that the setting of the imaging and capturing parameters can be adapted individually to the respective observer, with the result that the imaging of the object and the presentation thereof can be improved further.

According to another aspect of the disclosure, the distance capturing is replaced by displaying a test image to ascertain the perceivable structure size. The test image can include for example lines or a grid structure, the distance of which is varied from test image to test image or decreases within the test image. The lines or test structures which are still identifiable as being separated from one another determine the perceivable structure size. The perceivable structure size is confirmed for the control device on an input device. The advantage of this aspect of the disclosure is that errors during the calculation or determination of the perceivable structure size from the distance and possibly the visual acuity are avoided, and no distance capturing device is necessary.

A variety of parameters of the imaging system are suitable for setting the actual structure size to the structure size which is still perceivable. One example is an aperture size which influences the depth of field of the image. Another example is pixel binning, in which the pixels used to generate the image are combined into groups. Here, the light sensitivity increases at the expense of the resolution. It is typical that the control device changes the number of the pixels by analogously and/or digitally interconnecting the pixels in groups, such that one electrical signal per group is present. This can be accomplished by processing image data or analogously interconnecting pixels on the detector. Typically, the number of pixels which are interconnected is such that as a consequence, the resolved structure size remains identical to or is smaller than the still perceivable structure size. By interconnecting the pixels, the light sensitivity of the detection device is increased, such that the signal-to-noise ratio of the image can be improved. This opens up room to increase the frame rate or to reduce the illuminance. At the same time, the observer will not notice a deterioration of the image, because the resolved structure size continues to be smaller than or identical to the perceivable structure size.

Another example of a parameter is the working distance. Typically, the imaging system includes a supporting device by which a working distance from the object is changeable, wherein the control device simultaneously adjusts the focus and increases the magnification scale and/or digitally post-enlarges the image if the working distance is increased in order to keep the overall magnification constant. In the case of a greater working distance, access to the object is better.

Another example is the depth of field and the quantity of light of the incident radiation per pixel and consequently the signal-to-noise ratio of the image. Stopping down can increase the depth of field. The smaller quantity of light lowers the signal-to-noise ratio and consequently the resolved structure size. If appropriate, the reduction in quantity of light can be compensated for, for example, by pixel binning. Similar is true for a reduction of the illuminance on the object.

One advantage of the microscope is that a sharp image is always displayed to the observer in dependence of his or her position with respect to the display device, and at the same time an optimization in accordance with other criteria is performed without endangering the image sharpness. Parameters of the imaging and of the production of the image are optimized without information losses occurring. In other words: The microscope dispenses with unnecessary, because non-perceivable, information for the benefit of elsewise image optimization.

BRIEF DESCRIPTION OF THE DRAWINGS

The disclosure will now be described with reference to the drawings wherein:

FIG. 3 shows a schematic illustration of pixels of a detection device of the microscope.

DESCRIPTION OF EXEMPLARY EMBODIMENTS

The aforementioned features and those yet to be explained below can be used not only in the combinations specified but also in other combinations or on their own, without departing from the scope of the present disclosure.

Figure 1:
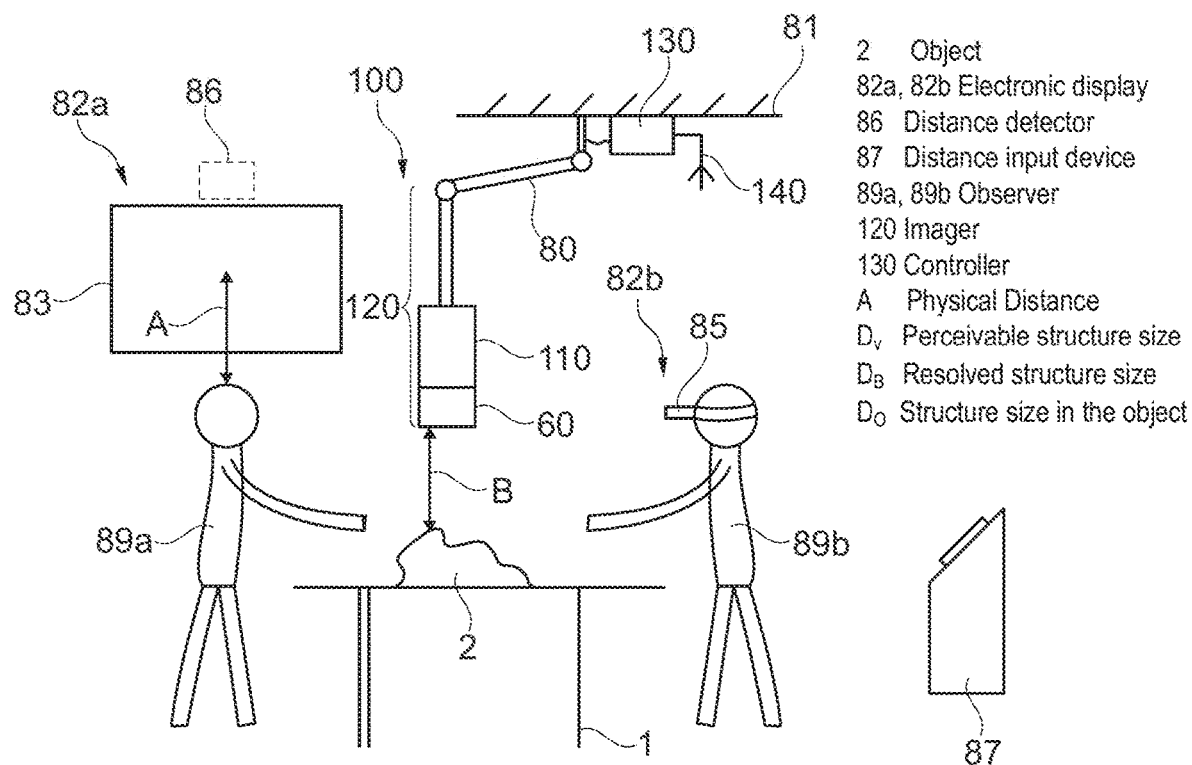
FIG. 1 shows a schematic illustration of a microscope and microscopy method according to an exemplary embodiment of the disclosure.

FIG. 1 schematically shows a microscope 100, which can be embodied for example in the form of a stereo microscope of the telescope type. The microscope 100 is a digital microscope, in the exemplary embodiment shown in FIG. 1 a digital surgical microscope. In this case, an object 2, for example a patient to be examined, is lying on an operating table 1. Illumination is effected by an illumination device that is integrated in the microscope 100. The object 2 is imaged by an imaging system 120 in a manner such that an electronic image is generated. The electronic image is displayed on a display device 82a, where a first observer, for example a surgeon 89a, can observe it. The electronic image is furthermore also displayed on a display device 82b, in the form of an HMD 85, worn by a second observer 89b, for example a surgical assistant.

The operation of the microscope 100 is controlled by a control device 130, which receives signals from the imaging system 120 by lines, which are not shown in more detail, and is in radio communication via an antenna 140 in the exemplary embodiment illustrated here with the display devices 82a and 82b and an input device 87, which will be explained below.

The imaging system 120 is attached to a carrying structure, for example a ceiling 81, via an articulated supporting arm 80. The supporting arm 80 includes on the hinges drives, with the result that the control device 130 can set the orientation of the imaging system 120 relative to the object 2 and in particular a working distance B. In the exemplary embodiment shown in FIG. 1, the imaging system 120 includes a microscope part 110 having a zoom optical unit 60 with which the optical working distance and an optical imaging scale can be set. The corresponding adjustment is accomplished under the control of the control unit 130.

Figure 2:
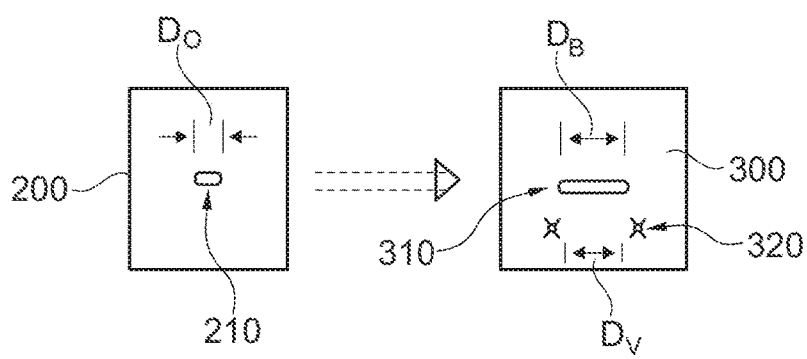
FIG. 2 shows a schematic for explaining structure sizes that are relevant for the microscope and the associated microscopy method.

The latter produces electronic image data from the electronic signals and causes them to be displayed on the display devices 82a and 82b. The overall magnification with which the object 2 is presented on the display device 82a and 82b thus not only depends on the optical magnification, but also on any digital post-enlargement of the electronic image and the magnification which is caused by the structural size or image size of the imaging device 82a and 82b. This configuration is shown in FIG. 2. On the left, FIG. 2 shows an object detail 200, and on the right FIG. 2 shows the image detail 300 obtained by imaging and presentation on for example the display device 82a. A structure size 210 having an extent DO in the object, for example the distance between the two points shown in the figure, is assigned a structure size 310 having an extent of DB in the image due to the imaging by the imaging system and the display on the display device. If the microscope has, for example, a 100× magnification (including taking the magnification due to the display device into account), DB is a hundred times larger than DO. A structure size which has a length of 100 μm for example in the object detail 200, is then 10 mm long in the image detail 300.

The observer 89a and 89b cannot identify on the display device 82a, 82b assigned to him or her arbitrarily small structure sizes. A substantial parameter which defines the structure size that the observer can still identify is the distance A at which the observer is located relative to the display device that is assigned to him or her. This circumstance is then taken into consideration in the setting of the imaging system by the control device 130. FIG. 2 shows, by way of example, a structure 320 which the observer in the image detail 300 can still resolve, for example two points that said observer can still identify as being separate. Owing to the distance A (and any further circumstances which will be explained below), these points are located at an extent $D_V$. In the situation shown in FIG. 2, the latter is greater than the resolved extent $D_B$. Only structures of identical size or larger than the still perceivable structure size with the extent $D_V$ can be identified by the observer on the display device, that is to say in the image detail 300. Smaller structure sizes represent a degree of detail that the observer does not perceive.

Attaining resolution in a microscope is now associated with a specific outlay, typically manifesting in image restrictions or restrictions with respect to image production. Examples will be explained below and have already been mentioned in the general part of the description. The control device 130 therefore sets the imaging system 120 such that the actually resolved structure size having the extent $D_B$ is, within a tolerance range, identical to the perceivable structure size having the extent $D_V$, and is typically not larger. This sacrifice in resolution permits the setting of the imaging system 120 such that other parameters of the imaging are optimized.

A particularly illustrative example is the increase of the working distance. A greater working distance B makes access to the object 2 easier for the user. The control device 130 increases the working distance B, for example by actuating the supporting arm 80 (alternatively by lowering the operating table 1) and compensates the actually associated change in overall magnification by an opposite adjustment of the zoom optical unit 60. As a consequence, the observer sees on the display device the same image detail in constant total magnification. The observer will not notice the fact that the resolution is lower due to the greater working distance as long as $D_B$ is not greater than $D_V$.

For ascertaining the perceivable structure size, in a first exemplary embodiment shown in dashed lines in FIG. 1, a distance capturing device in the form of a distance sensor 86 is attached to the screen 83 of the display device 82a. In this way, the distance A between the observer 89a, typically the observer's eyes, and the screen 83 is measured. The control device 130 calculates from the distance A the extent $D_V$ of the still perceivable structure size that the user 89a can still identify on the screen 83. Based on this perceivable structure size, the control device 130 correspondingly adjusts the imaging system 120.

When determining the structure size that the observer can still perceive, that is to say resolve, the control device 130 can use a standard visual acuity for the observer 89a as the basis. In a refinement, the visual acuity of the user 89a is taken into consideration in the determination. The corresponding means which are provided for this purpose in the control device 130, for example a corresponding table that indicates, from visual acuity and distance, the value of $D_V$, or a corresponding conversion function, have already been explained above. The visual acuity can be input via an input device 87.

In another exemplary embodiment, the distance sensor 86, shown in dashes, is functionally replaced by the input device 87 on which the user inputs his or her distance A from the display device.

In a further exemplary embodiment, the control device 130 takes into account a type of the display device that is communicated for example via the input device 87 and ascertains therefrom the distance A that is available for this type. This is well suitable for display devices which are worn on the body, for example the HMD 85.

In a further exemplary embodiment, which likewise operates without the distance sensor 86, a test image is shown to the observer to ascertain which dimension $D_V$ he or she can still resolve. Corresponding feedback can be given either controlled by a look or via the input device 87. In this exemplary embodiment, the visual acuity of the respective observer is automatically taken into account.

As already mentioned, in the microscopy method performed by the control device 130 on the microscope 100, the image capturing and presentation are optimized, wherein the margin is provided by a reduction of the resolution toward the still perceivable structure size. The mechanisms and optimizations explained above can be used here. Specifically, the following parameters of the image capturing and/or presentation can be set in the case of the optimization: working distance, illumination brightness on the object 2, digital post-enlargement or reduction in size, frame rate, setting a depth-of-field stop, pixel binning during operation of the detector, pixel binning in the electronic image data obtained, pixel binning on the display device, turning off "upscaling" on the display device, and working distance B.

According to an exemplary embodiment, when performing the setting, the overall magnification with which the object is displayed on the display device remains constant. Provision is furthermore made in exemplary embodiments in the sense of an optimization that, with constant overall magnification, two parameters of the imaging and/or capturing (this term refers to the capturing of an optically imaged image with electronic means and the post processing thereof) are adjusted in opposite fashion, such that the total magnification overall remains the same and the resolvable structure size ($D_B$) is adapted to the still perceivable structure size ($D_V$).

Frequently, the electronic image data generated with the microscope 100 are recorded. For these purposes, it is typical to fix a maximum upper limit for the resolved structure size $D_B$ to prevent the recorded data from having a resolution that is too low. It is also not absolutely necessary that the resolved structure size is exactly the same as the still perceivable structure size. A deviation within a tolerance range is possible, for example to avoid frequent adjustment of the imaging system 120. However, the tolerance range is preferably such that the resolved structure size does not exceed the still perceivable structure size.

It is understood that the foregoing description is that of the exemplary embodiments of the disclosure and that various changes and modifications may be made thereto without departing from the spirit and scope of the disclosure as defined in the appended claims.

What is claimed is:

1. A digital microscope, comprising:
   an electronic display;
   an imager configured to image an object and to generate an image signal;
   a distance detector and/or distance input device configured to determine a physical distance between an observer and the electronic display; and
   a controller in communication with the electronic display via a first communication interface and with the imager via a second communication interface, the controller being configured to:
   generate an image of the object from the image signal, the image having a resolved structure size describing a first distance between two points that are separated in the image,
   display the image on the electronic display,
   determine a perceivable structure size, perceivable on the electronic display depending on the physical distance, the perceivable structure size describing a second distance between two points that the observer can identify as being separate, and
   adjust the imager to cause the resolved structure size, resolved by the electronic display, to be identical to the perceivable structure size within a given tolerance range such that structures do not appear on the electronic display that are not perceivable by the observer.

2. The digital microscope as claimed in claim 1, wherein the distance detector and/or distance input device measures the distance between the electronic display and the observer.

3. The digital microscope as claimed in claim 1, wherein:
   the electronic display includes at least one display unit configured to be worn on a body of the observer, and
   the distance detector and/or distance input device includes a module of the controller setting the electronic display device to the resolved structure size.

4. The digital microscope as claimed in claim 1, wherein the controller is configured to determine the perceivable structure size depending on a visual acuity of the observer.

5. The digital microscope as claimed in claim 4, further comprising:
   an input device configured for inputting an indication of the visual acuity.

6. The digital microscope as claimed in claim 1, wherein:
   the controller includes a computer-readable storage medium on which a table of values is stored, the table of values representing a relationship between the physical distance and the perceivable structure size, and
   the controller is further configured to adjust the imager based on the table.

7. The digital microscope as claimed in claim 1, wherein the first communication interface is a wireless communication interface and the second communication interface is a wired communication interface.

8. A microscope, comprising:
   an electronic display;
   an imager configured to image an object and to generate an image signal; and
   a controller in communication with the electronic display via a first communication interface and with the imager via a second communication interface, the controller being configured to:
   display a test image for an observer to determine a perceivable structure size, perceivable by the observer, the test image having a resolved structure size describing a first distance between two points that are separated in the image, and the perceivable structure size describing a second distance between two points that the observer can identify as being separate, and
   adjust the imager to cause the resolved structure size, resolved by the electronic display, to be identical to the perceivable structure size within a given tolerance range such that structures do not appear on the electronic display that are not perceivable by the observer.

9. The microscope as claimed in claim 8, wherein the controller is configured not to raise the resolved structure size above a given limit value.

10. The microscope as claimed in claim 8, wherein the controller is configured to:
    adjust the imager to set the resolved structure size by being capable of adjusting a focal length of an imaging optics, an imaging scale of the imaging optics, a number of pixels for a presentation or for image capturing, an exposure time, a working distance between the imager and the object, a digital image magnification, pixel binning, and an illuminance, and
    keep a total magnification constant.

11. The microscope as claimed in claim 10, wherein the controller is configured to:
    determine a difference between the resolved structure size and the perceivable structure size, and
    adjust the imager to minimize the difference and to keep the total magnification constant.

12. The microscope as claimed in claim 8, wherein the first communication interface is a wireless communication interface and the second communication interface is a wired communication interface.

13. A digital microscopy method for imaging an object, the method comprising:
    imaging the object;
    generating an image of the object, the image having a resolved structure size describing a first distance between two points that are separated in the image;
    displaying the image of the object on a display of an imager;
    determining a physical distance between an observer and the display;
    determining a perceivable structure size, perceivable on the display depending on the physical distance, the perceivable structure size describing a second distance between two points that the observer can identify as being separate, and
    adjusting, by a controller in communication with the display via a first communication interface and with the imager via a second communication interface, the imager to cause the resolved structure size, resolved by the display, to be identical to the perceivable structure size within a given tolerance range such that structures do not appear on the display that are not perceivable by the observer.

14. The microscopy method as claimed in claim 13, further comprising:
   determining a visual acuity of the observer depending on the perceivable structure size.

15. The microscopy method as claimed in claim 13, further comprising:
   adjusting the imager to set the resolved structure size, resolved by the display, by adjusting at least one of a focal length of an imaging optics, an imaging scale of the imaging optics, a number of pixels for presenting or image capturing, an exposure time, a working distance between the imager and the object, a digital image enlargement, a pixel binning, and an illuminance; and
   keeping a total magnification constant.

16. The microscopy method as claimed in claim 15, further comprising:
   minimizing a difference between the resolved structure size and the perceivable structure size;
   keeping the total magnification constant, and
   improving properties of the image including a contrast, a signal-to-noise ratio, and an exposure of the object to illumination.

17. The microscopy method as claimed in claim 13, further comprising:
   storing a table of values representing a relationship between the physical distance and the perceivable structure size, and
   adjusting the imager based on the table.

18. The microscopy method as claimed in claim 13, wherein the first communication interface is a wireless communication interface and the second communication interface is a wired communication interface.

* * * * *

UNITED STATES PATENT AND TRADEMARK OFFICE
CERTIFICATE OF CORRECTION

PATENT NO. : 11,036,040 B2
APPLICATION NO. : 16/403242
DATED : June 15, 2021
INVENTOR(S) : Regensburger et al.

It is certified that error appears in the above-identified patent and that said Letters Patent is hereby corrected as shown below:

In the Specification

For BRIEF DESCRIPTION OF THE DRAWINGS:

<u>In Column 6:</u>
Line 27: delete "FIG. 3 shows a schematic illustration of pixels of a"
Line 28: delete "detection device of the microscope."

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*